3,245,748
HIGH SPEED FRAMING CAMERA
Jack Wadsworth and Frank E. Stokes, Ottawa, Ontario, Canada, assignors to Canadian Patents and Development Limited, Ottawa, Ontario, Canada, a corporation of Canada
Filed Feb. 17, 1964, Ser. No. 345,442
3 Claims. (Cl. 352—84)

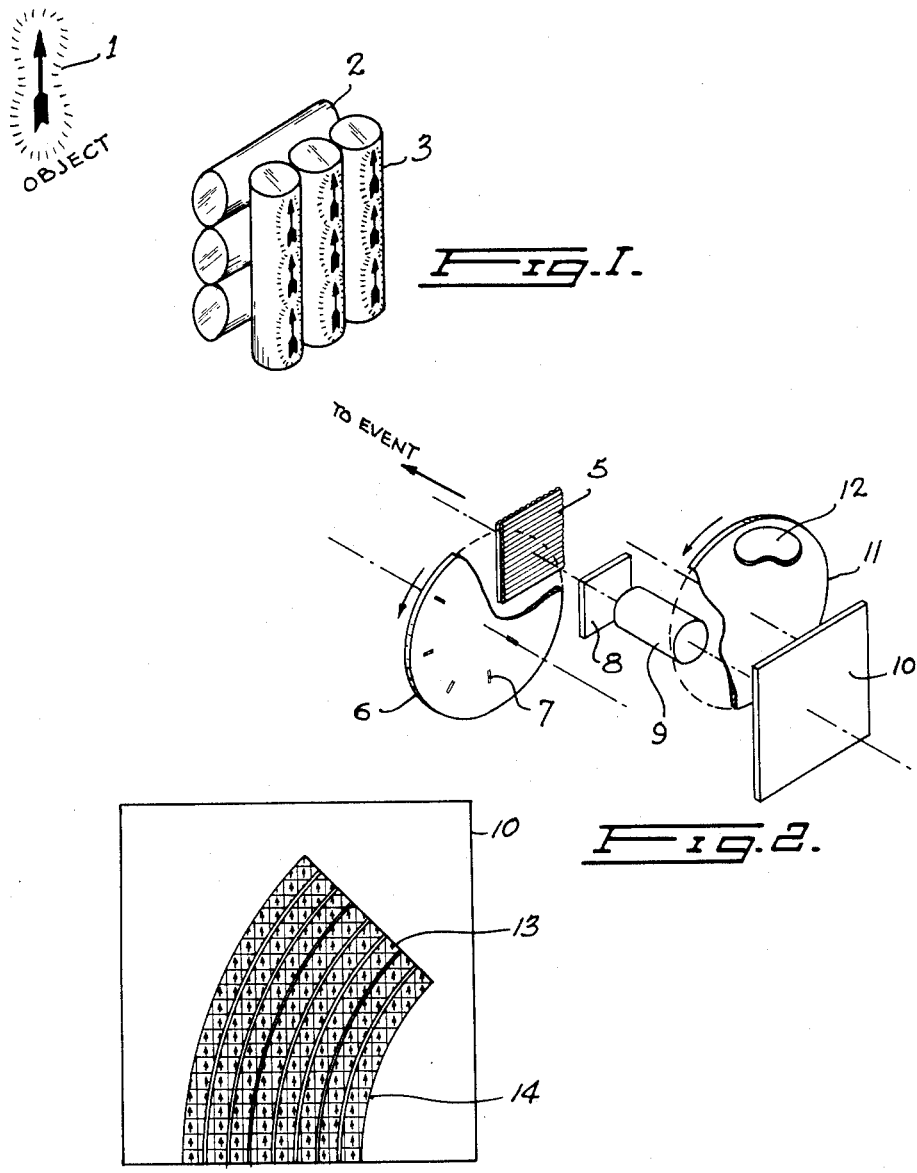

This invention relates to a high speed framing camera and more particularly to a framing camera using a simple image multiplier.

In high speed photographic study of fast moving events such as detonation waves and shock waves it has been realized that very high resolution is not a strict requirement. The most important aspect of this study was the changing shape of the wave front. If the resolution requirements are relaxed, image dissection techniques such as lenticular plates, fiber optics, and grids become attractive and cameras that are simple in principle to construct may result. These cameras however have been found to demand a precision of alignment of image dissection with photographic emulsion that is difficult. Another complication is that an image dissection record is not immediately readable but has to be unscrambled by playing it back through the image dissector.

It is an object of the present invention to provide a high speed framing camera that is simple in design, inexpensive to construct, and which provides high speed framing with sufficiently high resolution for many applications.

These and other objects of the invention are achieved by providing a camera in which an image multiplier capable of forming a large number of images is aimed at the event or object under study, a large portion of the area of the image multiplier is sequentially scanned, and the resulting scanned sequence of images is focussed on a suitable stationary film.

In drawings which illustrate an embodiment of the invention,

FIGURE 1 is a view of a simple image multiplier showing the principle of image multiplication, FIGURE 2 shows the general arrangement of the operative parts of the camera, and FIGURE 3 shows the area and sequence of the scanning of the image multiplier.

Referring to FIGURE 1, it has been found that a simple and inexpensive image multiplier can be constructed using glass blowers' cane crossed at right angles. As shown in the figure, three pieces of glass cane 2 crossed at right angles with another set of three pieces of cane produces nine real images 3 of the one object 1. One real image is formed at each intersection of the glass canes.

The result of relaxing the resolution requirements, as mentioned above, was the ability to use small images of the event on the photographic emulsion on the film. This led to the building of a camera based upon image multiplication and FIGURE 2 shows the general design of such a camera. An image multiplier 5 which is made up of a large number of crossed canes is allowed to look at the event under study. In an actual camera built according to the invention, 24 pieces of glass blowers' cane were crossed with another 24 pieces arranged at right angles. The glass blowers' cane was approximately ¼ in. in diameter which made the multiplier itself apparently 6 inches square. The multiplier was capable of producing 576 images of one object. A process or copying lens 9 focusses the images produced in the glass of the image multiplier on to a piece of film 10. Some astigmatism is introduced by the image multiplier and a simple cylindrical spectacle lens 8 is positioned in the optical path to correct for this. The framing action of the camera is provided by a Nipkow disc 6 mounted behind the image multiplier and in which a series of slits 7 are cut. It should be pointed out that the position of the Nipkow disc is not limited but may be positioned adjacent to any focal plane in the camera system i.e. immediately before or behind the image multiplier or immediately in front of the photographic emulsion of the film. In the camera built, the Nipkow disc had a diameter of 15 in. and was constructed from ⅛ in. thick aluminum plate. The disc had eight radial slits ¹⁄₁₆ in. wide and ⅜ in. long in the radial direction. The slits were equally spaced angularly 45° apart and were radially staggered inwardly in arithmetical progression. The disc was rotated at a speed of up to 18,000 r.p.m. This can be conveniently done by using an impulse air turbine (not shown) although other methods of driving might be used. The Nipkow disc gives essentially a focal plane shuttering action. A synchronizing disc 11 having a suitably sized aperture 12 is positioned close to the copying lens 9. This disc was also 15 in. in diameter and was rotated at 3450 r.p.m. by standard electric motor means (not shown). The aperture is of a size to allow the film to be exposed approximately one revolution of the Nipkow disc. This synchronizing shutter disc was made necessary by the persistence of stray light from the object that lasted several times longer than the availability of the camera. In many applications the synchronizing shutter would not be necessary.

FIGURE 3 shows the portion of the image multiplier 10 scanned by the Nipkow disc. Eight sequential scans 13 are made by the slits in the Nipkow disc and it can be seen that a large number of images 14 of the event will be produced on the film. These images can be readily analysed by the researcher to establish the sequential change in shape of the event under study.

Apart from the astigmatism which is easily corrected by using a simple, cylindrical lens, the camera has two other important faults. These are optical distortion and parallax. These two faults can be reduced or eliminated by stationing a reference grid at the event under study.

Due to the continuous availability of the camera, no elaborate synchronization with the event is required. This leads to a very simple photographic system. In addition, because the image plane is flat and approximately square, self-developing emulsions (commercially available) may be used if extremely fast availability of results is required.

What is claimed is:
1. A high speed framing camera for photographing high speed phenomena comprising,
   (a) an image multiplier positoned to view said phenomena and capable of forming a plurality of images thereof,
   (b) scanning means positioned in the camera system to sequentially scan a substantial area of the image multiplier,
   (c) a photographic film positioned behind the image multiplier and in spaced relation to it, and
   (d) focussing means positioned between said image multiplier and said film to focus the light received from said multiplier onto said film.

2. A high speed framing camera as in claim 1 in which the image multiplier is made up of a first series of parallel glass rods crossed substantially at right angles to a second series of parallel glass rods.

3. A high speed framing camera as in claim 1 in which the scanning means is a Nipkow disc having a series of inwardly staggered slits cut in its surface.

References Cited by the Examiner
UNITED STATES PATENTS 1,245,856  11/1917  Avers ---------------- 352—82
3,116,660  1/1964   Goss et al. ----------- 352—84

OTHER REFERENCES

J. S. Courtney-Pratt et al.: "Construction and Performance of a High-Speed Cinematograph," pages 256–262, The Review of Scientific Instruments, vol. 28, No. 4, April 1957.

NORTON ANSHER, *Primary Examiner.*